(12) United States Patent
Kistner

(10) Patent No.: US 9,776,609 B2
(45) Date of Patent: Oct. 3, 2017

(54) PRESSURE SUPPLY DEVICE FOR A HYDRAULIC BRAKING SYSTEM, HYDRAULIC BRAKING SYSTEM FOR A VEHICLE AND METHOD FOR OPERATING A HYDRAULIC BRAKING SYSTEM OF A VEHICLE

(71) Applicant: Robert Bosch GmbH, Stuttgart (DE)

(72) Inventor: Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 62 days.

(21) Appl. No.: 14/739,615

(22) Filed: Jun. 15, 2015

(65) Prior Publication Data
US 2015/0360659 A1 Dec. 17, 2015

(30) Foreign Application Priority Data
Jun. 13, 2014 (DE) .................. 10 2014 211 347

(51) Int. Cl.
*B60T 13/00* (2006.01)
*B60T 11/16* (2006.01)
(Continued)

(52) U.S. Cl.
CPC ............ *B60T 11/16* (2013.01); *B60T 8/4018* (2013.01); *B60T 11/224* (2013.01); *B60T 13/66* (2013.01); *B60T 8/326* (2013.01)

(58) Field of Classification Search
CPC ...... B60T 11/16; B60T 11/224; B60T 13/662; B60T 13/686; B60T 13/143; B60T 7/042;
(Continued)

(56) References Cited

U.S. PATENT DOCUMENTS

| | | | | | |
|---|---|---|---|---|---|
| 4,703,978 A | * | 11/1987 | Belart | ..................... | B60T 8/446 188/345 |
| 5,970,710 A | * | 10/1999 | Dieringer | ................ | B60T 8/441 60/575 |

(Continued)

FOREIGN PATENT DOCUMENTS

| | | | |
|---|---|---|---|
| DE | WO-2009/121645 A1 | * | 10/2009 |
| DE | 102013205627 | | 10/2014 |
| DE | 102013211503 A1 | | 12/2014 |

*Primary Examiner* — Pamela Rodriguez
(74) *Attorney, Agent, or Firm* — Norton Rose Fulbright US LLP

(57) ABSTRACT

A pressure supply device is provided for a hydraulic braking system of a vehicle including a first pressure chamber and a second pressure chamber, which are delimited by at least one piston of the pressure supply device, a motor and a gear unit, with the aid of which the at least one piston is displaceable at least in a first direction with the aid of an operation of the motor, an exceeding of a predefined maximum pressure difference between a chamber pressure present in the first pressure chamber and a reservoir pressure present in the brake fluid reservoir being preventable with the aid of a reservoir isolating valve, which is connectable to a brake fluid reservoir of the braking system, hydraulically connected to the first pressure chamber via an opening of the reservoir isolating valve. Also described here is a hydraulic braking system for a vehicle. In addition, a method is provided for operating a hydraulic braking system of a vehicle.

17 Claims, 2 Drawing Sheets

(51) Int. Cl.
  *B60T 11/224*  (2006.01)
  *B60T 8/40*  (2006.01)
  *B60T 13/66*  (2006.01)
  *B60T 8/32*  (2006.01)

(58) Field of Classification Search
  CPC .......... B60T 8/441; B60T 8/446; B60T 8/326; B60T 8/4018; B60T 13/66
  USPC .......... 303/6.01, 10, 15, 20, DIG. 1, DIG. 2; 60/545, 574, 575; 92/209, 233
  See application file for complete search history.

(56) References Cited

U.S. PATENT DOCUMENTS

| | | | | |
|---|---|---|---|---|
| 8,876,223 B2* | 11/2014 | Schiel | ................... | B60T 7/042 188/152 |
| 2013/0234501 A1* | 9/2013 | Leiber | ................... | B60T 8/4018 303/10 |
| 2013/0298550 A1* | 11/2013 | Leiber | ................... | B60T 7/042 60/545 |
| 2015/0158475 A1* | 6/2015 | Lhuillier | ................ | B60T 11/16 303/114.1 |
| 2016/0046272 A1* | 2/2016 | Masur | ................ | B60T 13/662 303/15 |
| 2016/0082938 A1* | 3/2016 | Vollert | ................ | B60T 11/224 303/115.2 |

* cited by examiner

PRESSURE SUPPLY DEVICE FOR A HYDRAULIC BRAKING SYSTEM, HYDRAULIC BRAKING SYSTEM FOR A VEHICLE AND METHOD FOR OPERATING A HYDRAULIC BRAKING SYSTEM OF A VEHICLE

FIELD OF THE INVENTION

The present invention relates to a pressure supply device for a hydraulic braking system of a vehicle. The present invention also relates to a hydraulic braking system for a vehicle. In addition, the present invention relates to a method for operating a hydraulic braking system of a vehicle.

BACKGROUND INFORMATION

Braking systems for a vehicle are described in a German patent application having application number German Published Patent Application No. 10 2013 205 627.3. All of the braking systems described include a power braking device designed, for example, as a plunger. The at least one pressure chamber of the power braking device may be connected via one separating valve each to a first brake circuit and a second brake circuit of the braking system. It is intended, with the aid of an operation of the power braking device, for a brake pressure to be increasable in at least one wheel brake cylinder of the first brake circuit and of the second brake circuit.

SUMMARY

The present invention provides a pressure supply device for a hydraulic braking system of a vehicle, a hydraulic braking system for a vehicle, and a method for operating a hydraulic braking system of a vehicle.

The present invention provides possibilities for a power brake pressure build up in at least one wheel brake cylinder, a comparatively large brake fluid volume being transferable in a short period of time from the pressure supply device into the at least one wheel brake cylinder. Thus, an advantageously high dynamic may be ensured during the required phases of the brake pressure build up in the at least one wheel brake cylinder. At the same time, the present invention provides possibilities, which allow a comparatively cost-efficient motor to be used for the power brake pressure build up in the at least one wheel brake cylinder.

This may also be described in that, with respect to motor performance, the present invention resolves a traditional conflict between the brake fluid volume to be conveyed for the power brake pressure build up in the at least one wheel brake cylinder and the resultant pressure occurring in the braking system. Specifically, a lighter, more cost-efficient motor requiring little installation space may therefore be used for the power brake pressure build up in the at least one wheel brake cylinder, without having to tolerate losses during the effectuated braking of the respective vehicle.

In one advantageous specific embodiment of the pressure supply device, a first brake circuit including at least one first wheel brake cylinder is connectable to the first pressure chamber and a second brake circuit including at least one second wheel brake cylinder is connectable to the second pressure chamber in such a way that a brake pressure increase may be effected in the at least one first wheel brake cylinder and in the at least one second wheel brake cylinder with the aid of a displacement of the at least one piston in the first direction. The pressure supply device may thus be used to effect a power brake pressure build up in the at least one first wheel brake cylinder of the first brake circuit, as well as in the at least one second wheel brake cylinder of the second brake circuit.

During the brake pressure increase in the at least one first wheel brake cylinder and in the at least one second wheel brake cylinder, a motor torque to be applied by the motor advantageously increases with a first gradient when a pressure difference between the chamber pressure and the reservoir pressure is below the predefined maximum pressure difference, and increases, at most, with a second gradient smaller than the first gradient from a pressure difference between the chamber pressure and the reservoir pressure equal to the predefined maximum pressure difference. As an alternative or in addition thereto, a first volume flow from the pressure supply device may be transferable into the two brake circuits during the brake pressure increase in the at least one first wheel brake cylinder and in the at least one second wheel brake cylinder when a pressure difference between the chamber pressure and the reservoir pressure is lower than the predefined maximum pressure difference, and a second volume flow from the pressure supply device may be transferable into the two brake circuits after the predefined maximum pressure difference between the chamber pressure and the reservoir pressure is reached, the first volume flow being greater than the second volume flow. Thus, the demands on the motor of the pressure supply device are comparatively minimal. This permits the use of a motor for the pressure supply device having little installation space requirement, a light weight and comparatively low manufacturing costs. The gear unit cooperating with the motor may also be cost-efficiently designed due to the comparatively minimal demands to be met.

The pressure supply device may, for example, have only one single piston, designed as a stepped piston, as the at least one piston. The designability of the pressure supply device is not limited to this example, however.

The previously described advantages are also ensured in the case of a corresponding hydraulic braking system.

In the case of the hydraulic braking system as well, a first brake circuit including at least one first wheel brake cylinder at the first pressure chamber and a second brake circuit including at least one second wheel brake cylinder at the second pressure chamber may be connected in such a way that a brake pressure increase may be effected in the at least one first wheel brake cylinder and in the at least one second wheel brake cylinder with the aid of a displacement of the at least one piston in the first direction. Thus, power braking or brake boosting operations may be carried out on the hydraulic braking system as well.

In another advantageous specific embodiment, the hydraulic braking system includes a separating valve hydraulically connected to the first pressure chamber, via which the first brake circuit is connected to the first pressure chamber. Via a closing of the separating valve, it is possible, despite an opening of the reservoir isolating valve, to prevent an undesirable pressure drop in the first brake circuit.

The hydraulic braking system preferably includes a circuit separating valve, via which the first brake circuit is connected to the second brake circuit. Thus, a pressure balance in the first brake circuit and in the second brake circuit may be effected via an opening of the circuit separating valve. Specifically, via an opening of the circuit separating valve after a closing of the separating valve, it may be ensured that even the brake pressure present in the at least one first wheel brake cylinder of the first brake circuit may still be increased via a transfer of brake fluid from the second pressure chamber via the second brake circuit into the first brake circuit. Furthermore, the pressure build up dynamic in both the first brake circuit and in the second brake circuit may be improved via a closing of the circuit separating valve from a predefined minimum pressure.

For example, the reservoir isolating valve may be a pressure-switched valve, which is switchable with the aid of the pressure difference between the chamber pressure present in the first pressure chamber and the reservoir pressure present in the brake fluid reservoir. An activation of the reservoir isolating valve using an electrical signal is therefore unnecessary for the desired functionality of the reservoir isolating valve. This also eliminates the necessity of furnishing a control system cooperating with the hydraulic braking system with an additional signal output for providing the electrical signal for the reservoir isolating valve.

Equally, however, the reservoir isolating valve may also be an electrically switchable valve, which is switchable with the aid of at least one control signal of a control device. If necessary, the hydraulic braking system may include the control device, the control device preferably being designed to detect whether the pressure difference between the chamber pressure present in the first pressure chamber and the reservoir pressure present in the brake fluid reservoir reaches or exceeds the predefined maximum pressure difference and, if necessary, to switch the reservoir isolating valve to an at least partially opened state with the aid of the at least one control signal. The use of an electrically switchable valve permits, in particular, a predefining/re-establishing of the maximum pressure difference or of the threshold value, taking into account at least one physical variable, such as a temperature and/or a viscosity of the brake fluid of the hydraulic braking system. Thus, the functionality of the reservoir isolating valve may also be adapted to ambient conditions in such a way that the motor of the pressure supply device is operated sparingly, particularly in the case of low temperatures and/or a high viscosity of the brake fluid.

The aforementioned advantages are also ensured when carrying out the corresponding method for operating a hydraulic braking system of a vehicle. The method may be further refined according to the specific embodiments of the pressure supply device and/or the hydraulic braking system described above.

Moreover, it is possible during the method for the reservoir isolating valve to be electrically switched from its closed state to an at least partially opened state from a pressure difference between the chamber pressure present in the first pressure chamber and the reservoir pressure present in the brake fluid reservoir equal to the predefined maximum pressure difference. Thus, the feasibility of the method is not limited to merely the use of a pressure-switched valve for the reservoir isolating valve.

In another advantageous specific embodiment of the method, a separating valve, via which the first brake circuit is connected to the first pressure chamber, is switched from its open state into its closed state from a pressure difference between the chamber pressure present in the first pressure chamber and the reservoir pressure present in the brake fluid reservoir slightly below the predefined maximum pressure difference. The brake pressure present in the at least one first wheel brake cylinder of the first brake circuit is therefore unaffected by a subsequent opening of the reservoir isolating valve.

DETAILED DESCRIPTION

Figure 1A:
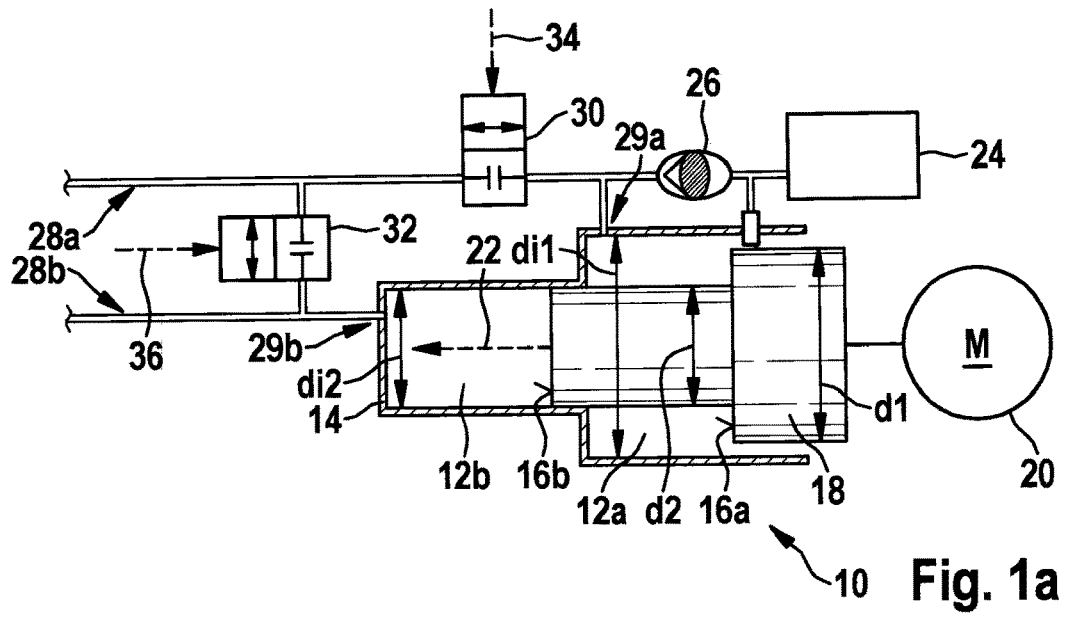
FIG. 1a through 1c schematically show a partial depiction of a first specific embodiment of the hydraulic braking system and coordinate systems for explaining its functionality.
Figure 1B:
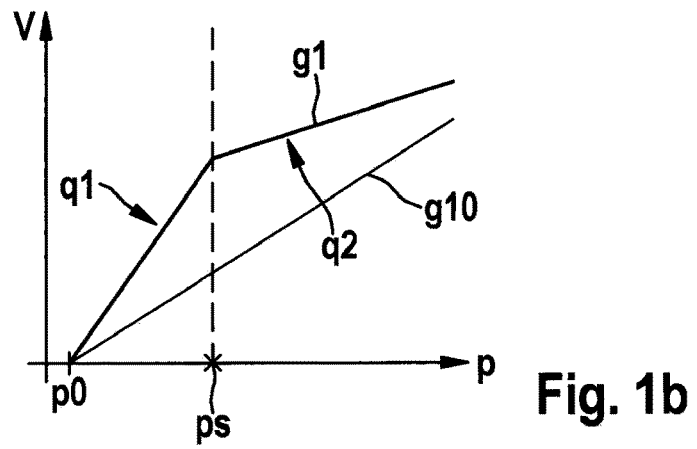
Figure 1C:
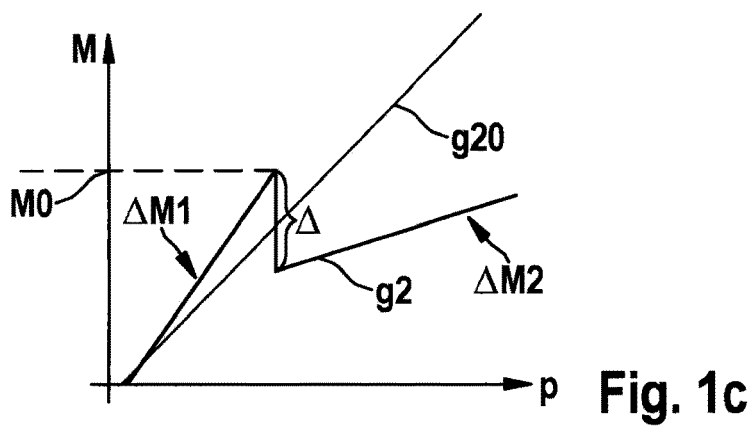

FIG. 1a through 1c schematically show a partial depiction of a first specific embodiment of the hydraulic braking system and coordinate system for explaining its functionality.

The hydraulic braking system partially schematically depicted in FIG. 1a may be used in a vehicle/motor vehicle. For example, the hydraulic braking system may be used in an electric vehicle or hybrid vehicle. It is noted that the usability of the hydraulic braking system is not limited to a particular vehicle type/motor vehicle type.

The hydraulic braking system includes a pressure supply device 10 including a first pressure chamber 12a and a second pressure chamber 12b. (Pressure supply device 10 may, in particular, be identifiable as a plunger.) First pressure chamber 12a and second pressure chamber 12b are preferably formed in a shared housing 14 of pressure supply device 10. First pressure chamber 12a is delimited by at least one first surface 16a of at least one piston 18 of pressure supply device 10. Similarly, second pressure chamber 12b is also delimited by at least one second surface 16b of the at least one piston 18 of pressure supply device 10. The at least one piston 18 is connected via a gear unit (not delineated) to a motor 20 of pressure supply device 10 in such a way that the at least one piston 18 is displaceable with the aid of an operation of motor 20 in at least one first direction 22 (preferably also in a second direction opposite first direction 22). As explained more precisely below, the displacement of the at least one piston 18 in first direction 22 is preferably understood to mean a displacement of the at least one piston 18 into first pressure chamber 12a and into second pressure chamber 12b. This may also be described such that a first volume of first pressure chamber 12a fillable with brake fluid and a second volume of second pressure chamber 12b fillable with brake fluid are reducible by displacing the at least one piston 18 of pressure supply device 10 in first direction 22. First direction 22 may thus also be described as a braking direction.

The hydraulic braking system also includes a brake fluid reservoir 24. In addition, the hydraulic braking system has a reservoir isolating valve 26, via which first pressure chamber 12a of pressure supply device 10 is connected to brake fluid reservoir 24. Reservoir isolating valve 26 is mechanically designed or electrically switchable in such a way that an exceeding of a predefined maximum pressure difference between a first chamber pressure present in first pressure chamber 12a and a reservoir pressure in brake fluid reservoir 24 is preventable via an opening of reservoir isolating valve 26. An opening of reservoir isolating valve 26 is understood to mean, for example, an opening of reservoir isolating valve 26 automatically taking place due to the mechanical design of the reservoir isolating valve 26. The electrical switchability of reservoir isolating valve 26 may likewise be interpreted, in such a way that a control device (not delineated) is designed to switch reservoir isolating valve 26 in such a way that before/during an exceeding of the predefined maximum pressure difference between the first chamber pressure present in first pressure chamber 12a and the reservoir pressure present in brake fluid reservoir 24, reservoir isolating valve 26 is controllable into an at least partially opened state with the aid of the control device.

The reservoir pressure may be understood to mean the atmospheric pressure. Reservoir isolating valve 26 is preferably operable in such a way that at the onset of a pressure build up in first pressure chamber 12a, reservoir isolating valve 26 is closed. Reservoir isolating valve 26 is preferably also mechanically designed or electrically switchable in such a way that reservoir isolating valve 26 is/remains in its closed state, as long as a pressure difference between the first chamber pressure (present in first pressure chamber 12a) and the reservoir pressure (present in brake fluid reservoir 24) remains less than the predefined maximum pressure difference during the displacement of first surface 16a in first direction 22/braking direction. Once the pressure difference (between the first chamber pressure and the reservoir pressure) becomes the same as the predefined maximum pressure difference, reservoir isolating valve 26 (due to its mechanical design or its electrical switchability) is then advantageously switched to its at least partially opened state. Even during a further displacement of first surface 16a in first direction 22/braking direction, reservoir isolating valve 26 is able to remain in its at least partially opened state until first surface 16a is displaced back in a direction opposite first direction 22/braking direction.

The advantageous connection of first pressure chamber 12a to brake fluid reservoir 24 via the advantageous mechanically designed or electrically switchable reservoir isolating valve 26 implements a limitation of a counterforce operating against the displacement of the at least one piston 18 of pressure supply device 10 in first direction 22/braking direction. Generally, the counterforce is defined as a sum of a first product of first surface 16a having the first chamber pressure present in first pressure chamber 12a and a second product of second surface 16b having a second chamber pressure present in second pressure chamber 12b. Thus, the maximum counterforce occurring during the displacement of the at least one piston 18 in first direction 22/braking direction may also be limited via a limiting of the pressure difference between the first chamber pressure and the reservoir pressure.

Power to be applied by motor 20 is also reducible (via the opening of reservoir isolating valve 26) with the aid of the implemented limitation of the counterforce to be overcome with the aid of motor 20 of pressure supply device 10. Motor 20 of pressure supply device 10 may therefore have a smaller installation space requirement, a lower weight and/or a reduced maximum motor power as opposed to a standard power braking device (without reservoir isolating valve 26). Pressure supply device 10 may therefore also be equipped with a more cost-efficient type of motor for motor 20.

In the specific embodiment of FIG. 1a, reservoir isolating valve 26 is situated outside of housing 14 of pressure supply device 10. It is noted, however, that the advantages described are also ensured in the case of a pressure supply device 10 including a reservoir isolating valve 26 situated on and/or in housing 14.

Moreover, reservoir isolating valve 26 in the specific embodiment described herein is a pressure-switched valve 26, which is switchable with the aid of the pressure difference between the first chamber pressure (present in first pressure chamber 12a) and the reservoir pressure (present in brake fluid reservoir 24). Due to the mechanical design of reservoir isolating valve 26, the valve is present in its closed state when the pressure difference between the first chamber pressure and the reservoir pressure is below the predefined (mechanically/structurally determined) maximum pressure difference. In contrast, a pressure difference (between the first chamber pressure and the reservoir pressure) equal to the maximum pressure difference effects an (automatic) switching of reservoir isolating valve 26 into an at least partially opened state, so that a further pressure increase in first pressure chamber 12a is preventable with the aid of a transfer of brake fluid from first pressure chamber 12a via reservoir isolating valve 26 into brake fluid reservoir 24.

The hydraulic braking system of FIG. 1a also includes a first brake circuit 28a (including at least one first wheel brake cylinder not shown) and one second brake circuit 28b (including a least one second wheel brake cylinder not depicted). First brake circuit 28a is connected to first pressure chamber 12a, in particular, to a first bore 29a formed thereon. Similarly, second brake circuit 28b is connected to second pressure chamber 12b, preferably to a second bore 29b formed thereon. The connection of first brake circuit 28a to first pressure chamber 12a and second brake circuit 28b to second pressure chamber 12b is such that brake fluid is transferable/forcible from pressure supply device 10 into connected brake circuits 28a and 28b with the aid of a displacement of the at least one piston 18 in first direction 22 in such a way that the brake pressures in the at least one first wheel brake cylinder and in the at least one second wheel brake cylinder are increasable. This may also be described in that an increase in brake pressure may be effected in the at least one first wheel brake cylinder and in the at least one second brake cylinder with the aid of a displacement of the at least one piston 18 in first direction 22.

The hydraulic braking system of FIG. 1a also includes a separating valve 30 hydraulically connected to first pressure chamber 12a/first bore 29a, via which first brake circuit 28a is connected to first pressure chamber 12a. In addition, the hydraulic braking system has a circuit separating valve 32, via which first brake circuit 28a may be connected to second brake circuit 28b.

Valves 30 and 32 are preferably designed as electrically switchable valves 30 and 32. To switch valves 30 and 32, a control device (not depicted) may be used, which outputs at least one first switching signal 34 to separating valve 30 and at least one second switching signal 36 to circuit separating valve 32.

FIG. 1b shows a coordinate system, the X-axis of which displays second chamber pressure p present in second pressure chamber 12b. A Y-axis of the coordinate system of FIG. 1b reflects a total volume V filled from pressure supply device 10 into first brake circuit 28a and into second brake circuit 28b during the displacement of the at least one piston 18 in first direction 22.

A graph g1 of the coordinate system of FIG. 1b reflects the values for total volume V obtained in the case of the hydraulic braking system of FIG. 1a. In contrast, graph g10 displays the corresponding values of a standard power braking device (without a pressure chamber connection to brake fluid reservoir 24 via reservoir isolating valve 26).

Second chamber pressure p may be increased via the displacement of second surface 16b of the at least one piston 18 in first direction 22/braking direction. Since reservoir isolating valve 26 is closed at the onset of operation of motor 20 of pressure supply device 10, the first chamber pressure in first pressure chamber 12a may also be increased in this phase. (Separating valve 30 is also opened in this phase.)

Brake fluid is forced, from a second chamber pressure p above a predefined response pressure p0, from first pressure chamber 12a via open separating valve 30 into first brake circuit 28a and from second pressure chamber 12b into second brake circuit 28b. For this reason, total volume V from the two pressure chambers 12a and 12b filled into first brake circuit 28a and into second brake circuit 28b continually increases from a second chamber pressure p above predefined response pressure p0. The control device is preferably designed in such a way that, from a predefined minimum pressure just above response pressure p0, it switches circuit separating valve 32 from its closed state into its opened state. Thus, a pressure balance is ensured in the two brake circuits 28a and 28b at the onset of the pressure build up. In addition, a pressure build up dynamic in the two brake circuits 28a and 28b may be improved at least temporarily via a closing of circuit separating valve 32, and a circuit separation may be ensured.

A transfer of brake fluid from first pressure chamber 12a into brake fluid reservoir 24 is prevented, as long as a pressure difference between the first chamber pressure (present in first pressure chamber 12a) and the reservoir pressure (present in brake fluid reservoir 24) during the displacement of first surface 16a in first direction 22/braking direction remains less than the predefined maximum pressure difference. Instead, the brake fluid volume forced from first pressure chamber 12a is transferred into first brake circuit 28a and into second brake circuit 28b. Graph g1 therefore exhibits a comparatively high first gradient for a second chamber pressure p between response pressure p0 and a predefined threshold value ps.

In the case of a second chamber pressure p equal to predefined threshold value ps, the pressure difference between the first chamber pressure and the reservoir pressure reaches the predefined maximum pressure difference. Thus, in the case of a second chamber pressure p equal to predefined threshold value ps, a switchover point of reservoir isolating valve 26 is reached, and reservoir isolating valve 26 is switched into an at least partially opened state. The control device is preferably also designed to close separating valve 30 just prior to reaching the switchover point of reservoir isolating valve 26. This ensures that during subsequent closing of reservoir isolating valve 26, first brake circuit 28a is already decoupled from first pressure chamber 12a, and the opening of reservoir isolating valve 26 causes no pressure drop in first brake circuit 28a. Thus, from a second chamber pressure p equal to predefined threshold value ps, the brake fluid forced out of first pressure chamber 12a is transferred exclusively into the brake fluid reservoir. (Circuit separating valve 32a is preferably also opened after an opening of reservoir isolating valve 26, so that brake fluid from second pressure chamber 12b may be filled via second brake circuit 28b into first brake circuit 28a via opened circuit separating valve 32.)

Thus, for a second chamber pressure p above threshold value ps, graph g1 exhibits a second gradient, which is smaller than the first gradient. This may also be described in that during the brake pressure increase in the at least one first wheel brake cylinder and in the at least one second wheel brake cylinder at a pressure difference between the first chamber pressure and the reservoir pressure below the predefined maximum pressure difference (or at a second chamber pressure p between response pressure p0 and threshold value ps), a first volume flow q1 is transferable from pressure supply device 10 into the two brake circuits 28a and 28b, and upon reaching the predefined maximum pressure difference between the first chamber pressure and the reservoir pressure (or from a second chamber pressure p above threshold value ps), a second volume flow q2 is transferable from pressure supply device 10 into the two brake circuits 28a and 28b, first volume flow q1 being greater than second volume flow q2. (First volume flow q1 and second volume flow q2 may each be understood to mean a time-related diversion of total volume V.) In contrast, graph g10 exhibits an identical gradient and an identical volume flow for all second chamber pressures p above response pressure p0.

Thus, the hydraulic braking system of FIG. 1 has an advantageous dynamic for the brake pressure build up in the wheel brake cylinders of its brake circuits 28a and 28b. A comparatively large total volume V is transferable into brake circuits 28a and 28b in a comparatively short period of time (i.e., at a second chamber pressure p between response pressure p0 and threshold value ps), whereas, from second chamber pressure p equal to threshold value ps, the desired pressure increase is carried out with the reduced second volume flow q2.

FIG. 1c shows a coordinate system, the X-axis of which reflects second chamber pressure p and the Y-axis of which reflects a motor torque M to be applied for a pressure buildup.

A graph g2 of the coordinate system of FIG. 1c reflects the motor torque M to be applied by motor 20 of the hydraulic braking system of FIG. 1a. In contrast, a graph g20 displays a motor torque M of a motor of a standard power braking device (without a pressure chamber connection to brake fluid reservoir 24 via reservoir isolating valve 26).

Motor torque M to be applied by motor 20 of pressure supply device 10 for transferring brake fluid from pressure supply device 10 into the two brake circuits 28a and 28b increases from response pressure p0 at a first gradient ΔM1. Graph g2 has a maximum M0 directly before threshold value ps. However, graph g2 shows a significant drop Δ of motor torque M at a second chamber pressure p equal to threshold value ps. For a second chamber pressure p greater than threshold value ps, motor torque M increases only with a second gradient ΔM2 smaller than first gradient ΔM1. Thus, during the brake pressure increase in the at least one first wheel brake cylinder and in the at least one second wheel brake cylinder, motor torque M to be applied by motor 20 increases with first gradient ΔM1 when a pressure difference between the first chamber pressure and the reservoir pressure is below the predefined maximum pressure difference and, after the drop Δ of motor torque M, increases with second gradient ΔM2 smaller than first gradient ΔM1 when a pressure difference (between the first chamber pressure and the reservoir pressure) is (virtually) the same as the predefined maximum pressure difference.

The difference between first gradient ΔM1 and second gradient ΔM2 is preferably so great that after the drop Δ, motor torque M of graph g2 no longer assumes the maximum M0 reached just before threshold value ps. Thus, during the brake pressure increase in the at least one first wheel brake cylinder and in the at least one second wheel brake cylinder, a motor torque M to be applied by motor 20 of pressure supply device 10 via a switching of reservoir isolating valve 26 into its open state may be limited to the maximum M0 as the predefined limit motor torque M0. As a result, a degree of freedom is created for cost optimization of motor 20 while leaving the system dynamic unchanged.

Pressure supply device 10 implemented on the hydraulic braking system of FIG. 1a may be described as a two-stage pressure supply device 10. Housing 14 of pressure supply device 10 is designed, merely by way of example, with an annular volume 12*a* as first pressure chamber 12*a*. Pressure supply device 10 includes only one single piston 18, which is designed as stepped piston 18. Stepped piston 18 has a first lower section with a first outer diameter d1, which is displaceable at least partially into first pressure chamber 12*a*, a first inner diameter di1 of first pressure chamber 12*a* correlating with first outer diameter d1 of stepped piston 18. In addition, stepped piston 18 has a second lower section with a second outer diameter d2 smaller than first outer diameter d1, which is displaceable at least partially into second pressure chamber 12*b* having a corresponding/adapted second inner diameter di2. It is noted that great design freedom is ensured in determining the relationship between first outer diameter d1 (and first surface 16*a*) and second outer diameter d2 (and second surface 16*b*). In particular, a desired dynamic of pressure device 10 may be ensured with the aid of a suitable determination of the relationship between first outer diameter d1 (and first surface 16*a*) and second outer diameter d2 (and second surface 16*b*).

Figure 2:
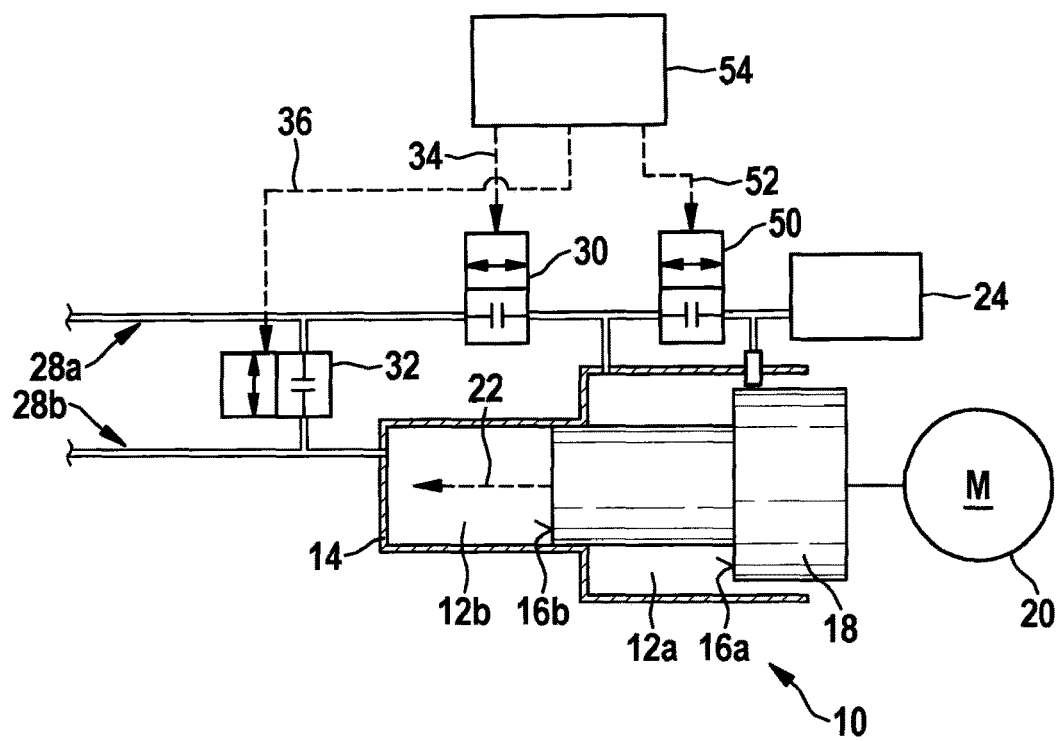
FIG. 2 schematically shows a partial depiction of a second specific embodiment of the hydraulic braking system.

FIG. 2 schematically shows a partial depiction of a second specific embodiment of the hydraulic braking system.

In the hydraulic braking system of FIG. 2, reservoir isolating valve 50 is an electrically switchable valve 50, which is switchable with the aid of at least one control signal 52 of a control device 54. In this case, control device 54 is preferably designed to detect whether a pressure difference between the first chamber pressure present in first pressure chamber 12*a* and the reservoir pressure present in the brake fluid reservoir reaches/exceeds the predefined maximum pressure difference. (The detection that a pressure difference between the first chamber pressure present in first pressure chamber 12*a* and the reservoir pressure present in the brake fluid reservoir reaches/exceeds the predefined maximum pressure difference may take place directly by evaluating a pressure sensor signal, or indirectly, for example, by evaluating a motor sensor signal.) If this is applicable, control device 54 is designed to switch reservoir isolating valve 50 into an at least partially opened state with the aid of the at least one control signal 52. Thus, the advantages described above are also implementable with the aid of a design of reservoir isolating valve 50 as an electrically switchable valve 50.

Figure 3:
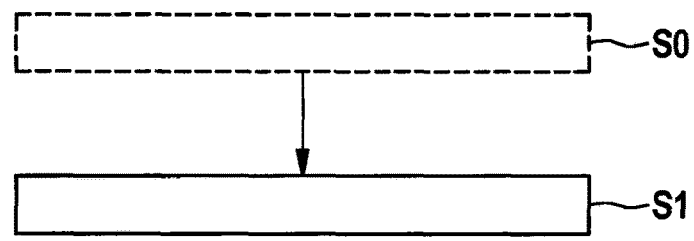
FIG. 3 shows a flow chart for explaining a specific embodiment of the method for operating a hydraulic braking system of a vehicle.

FIG. 3 shows a flow chart for explaining a specific embodiment of the method for operating a hydraulic braking system of a vehicle.

The method described below may be carried out, for example, with the aid of the hydraulic braking systems described above. It is noted, however, that the feasibility of the method is not limited to the use of such a hydraulic braking system.

In a method step S1, a brake pressure is increased in at least one first wheel brake cylinder of a first brake circuit of the hydraulic braking system and in at least one second wheel brake cylinder of a second brake circuit of the hydraulic braking system. For this purpose, a motor of a pressure supply device of the hydraulic braking system is activated in such a way that, with the aid of an operation of the motor, at least one piston of the pressure supply device is displaced in a first direction, as a result of which brake fluid is transferred at least temporarily from a first pressure chamber delimited by at least one first surface of the at least one piston into the connected first brake circuit and from a second pressure chamber delimited by at least one second surface of the at least one piston into the connected second brake circuit. During a carrying out of method step S1, the first pressure chamber is connected to a brake fluid reservoir of the hydraulic braking system via a reservoir isolating valve, the reservoir isolating valve being mechanically designed or electrically switched in such a way that an exceeding of a predefined maximum pressure difference between a chamber pressure present in the first pressure chamber and a reservoir pressure present in the brake fluid reservoir is preventable via an opening of the reservoir isolating valve. For example, the reservoir isolating valve may be closed at the onset of the pressure buildup in the wheel brake cylinders of the brake circuits. The reservoir isolating valve may be electrically switched from its closed state to its open state from a pressure difference between the chamber pressure present in the first pressure chamber and the reservoir pressure present in the brake fluid reservoir equal to the predefined maximum pressure difference. Likewise, however, a pressure-switched valve may also be used as the reservoir isolating valve for carrying out the method described herein.

In an optional method step S0, a separating valve, via which the first brake circuit is connected to the first pressure chamber, may be switched from its open state into its closed state from a pressure difference between the chamber pressure present in the first pressure chamber and the reservoir pressure present in the brake fluid reservoir just below the predefined maximum pressure difference. In this way, an undesirable pressure drop in the first brake circuit may be prevented.

The method as well ensures the advantages described above, a description of which will not be repeated here, however. The method may be further refined by additional method steps for switching the circuit separating valve in the manner described above.

What is claimed is:

1. A pressure supply device for a hydraulic braking system of a vehicle, comprising:
   at least one piston;
   a first pressure chamber;
   a second pressure chamber, wherein:
      the first pressure chamber is delimited by at least one first surface of the at least one piston; and
      the second pressure chamber is delimited by at least one second surface of the at least one piston;
   a motor;
   a gear unit via which the at least one piston is connected to the motor in such a way that the at least one piston is displaceable at least in a first direction with the aid of an operation of the motor; and
   a reservoir isolating valve that is configured to open in response to a predefined increase of a pressure difference between a chamber pressure present in the first pressure chamber and a reservoir pressure present in a brake fluid reservoir of the braking system to thereby hydraulically connect the first pressure chamber to the brake fluid reservoir, and thereby prevent the pressure difference from exceeding a predefined maximum pressure difference.

2. The pressure supply device as recited in claim 1, wherein the piston is only one single piston designed as a stepped piston.

3. The pressure supply device as recited in claim 1, wherein the reservoir isolating valve is a pressure-switched valve that is switchable with the aid of a pressure difference between the chamber pressure present in the first pressure chamber and the reservoir pressure present in the brake fluid reservoir.

4. The pressure supply device as recited in claim 1, wherein the reservoir isolating valve is an electrically switchable valve that is switchable with the aid of at least one control signal.

5. The pressure supply device as recited in claim 4, further comprising:
a control device for:
detecting whether a pressure difference between the chamber pressure present in the first pressure chamber and the reservoir pressure present in the brake fluid reservoir one of reaches and exceeds the predefined maximum pressure difference; and
if determined to be necessary based on the detection, switching the reservoir isolating valve to an at least partially opened state with the aid of the at least one control signal of the control device.

6. The pressure supply device as recited in claim 1, wherein a first brake circuit including at least one first wheel brake cylinder is connectable to the first pressure chamber and a second brake circuit including at least one second wheel brake cylinder is connectable to the second pressure chamber, by which connections of the first and second brake circuits the piston is configured to increase a brake pressure in the at least one first wheel brake cylinder and in the at least one second wheel brake cylinder by a displacement of the piston in the first direction.

7. The pressure supply device as recited in claim 1, wherein the reservoir isolating valve is configured to be in a first position in which the reservoir isolating valve does not hydraulically connect the first pressure chamber to the brake fluid reservoir during a first displacement of the at least one piston in the first direction and to be in a second position in which the reservoir isolating valve hydraulically connects the first pressure chamber to the brake fluid reservoir during a second displacement of the at least one piston in the first direction.

8. A pressure supply device for a hydraulic braking system of a vehicle, the pressure supply device comprising:
at least one piston;
a first pressure chamber;
a second pressure chamber;
a motor;
a gear unit via which the at least one piston is connected to the motor in such a way that the at least one piston is displaceable at least in a first direction with the aid of an operation of the motor; and
a reservoir isolating valve hydraulically connected to the first pressure chamber, which is connectable to a brake fluid reservoir of the braking system, and which is one of mechanically designed and electrically switchable in such a way that an exceeding of a predefined maximum pressure difference between a chamber pressure present in the first pressure chamber and a reservoir pressure present in the brake fluid reservoir is preventable via an opening of the reservoir isolating valve;
wherein:
the first pressure chamber is delimited by at least one first surface of the at least one piston;
the second pressure chamber is delimited by at least one second surface of the at least one piston; and
a first brake circuit including at least one first wheel brake cylinder is connectable to the first pressure chamber and a second brake circuit including at least one second wheel brake cylinder is connectable to the second pressure chamber, by which connections of the first and second brake circuits the piston is configured to increase a brake pressure in the at least one first wheel brake cylinder and in the at least one second wheel brake cylinder by a displacement of the piston in the first direction.

9. The pressure supply device as recited in claim 8, wherein during the brake pressure increase in the at least one first wheel brake cylinder and in the at least one second wheel brake cylinder, a motor torque to be applied by the motor increases with a first gradient when a pressure difference between the chamber pressure and the reservoir pressure is below the predefined maximum pressure difference and, from a pressure difference between the chamber pressure and the reservoir pressure equal to the predefined maximum pressure difference, increases at most with a second gradient smaller than the first gradient.

10. The pressure supply device as recited in claim 8, wherein during the brake pressure increase in the at least one first wheel brake cylinder and in the at least one second wheel brake cylinder, a first volume flow is transferable from the pressure supply device into the first and second brake circuits when a pressure difference between the chamber pressure and the reservoir pressure is below the predefined maximum pressure difference, and, upon reaching the predefined maximum pressure difference between the chamber pressure and the reservoir pressure, a second volume flow is transferable from the pressure supply device into the first and second brake circuits, the first volume flow being greater than the second volume flow.

11. The pressure supply device as recited in claim 8, further comprising:
a separating valve hydraulically connected to the first pressure chamber, via which the first brake circuit is connected to the first pressure chamber.

12. The pressure supply device as recited in claim 8, further comprising:
a circuit separating valve, via which the first brake circuit is connected to the second brake circuit.

13. The pressure supply device as recited in claim 8, wherein the pressure supply device is configured to be operated in:
a first mode in which the first pressure chamber is hydraulically connected to the first brake circuit for output of fluid from the first chamber to the first brake circuit and in which the reservoir isolating valve does not hydraulically connect the first pressure chamber to the brake fluid reservoir; and
a second mode in which the first pressure chamber is hydraulically disconnected from the first brake circuit and in which the reservoir isolating valve hydraulically connects the first pressure chamber to the brake fluid reservoir.

14. The pressure supply device as recited in claim 13, wherein, in the second mode, the second pressure chamber is hydraulically connected to the first brake circuit for output of fluid from the second chamber to the first brake circuit.

15. The pressure supply device as recited in claim 14, wherein, in the second mode, the second pressure chamber is also hydraulically connected to the second brake circuit for output of fluid from the second chamber to the second brake circuit.

16. The pressure supply device as recited in claim 15, wherein, in the first mode, the second pressure chamber is not hydraulically connected to the first brake circuit for output of fluid from the second chamber to the first brake circuit and is hydraulically connected to the second brake circuit for output of fluid from the second chamber to the second brake circuit.

17. The pressure supply device as recited in claim 14, wherein, in the first mode, the second pressure chamber is not hydraulically connected to the first brake circuit for output of fluid from the second chamber to the first brake circuit and is hydraulically connected to the second brake circuit for output of fluid from the second chamber to the second brake circuit.

* * * * *